No. 693,340. Patented Feb. 11, 1902.
A. J. TULLOCK, R. MODJESKI & B. B. CARTER.
ADJUSTABLE INCLINE OR TRANSFER.
(Application filed Aug. 2, 1899.)
(No Model.) 6 Sheets—Sheet 1.
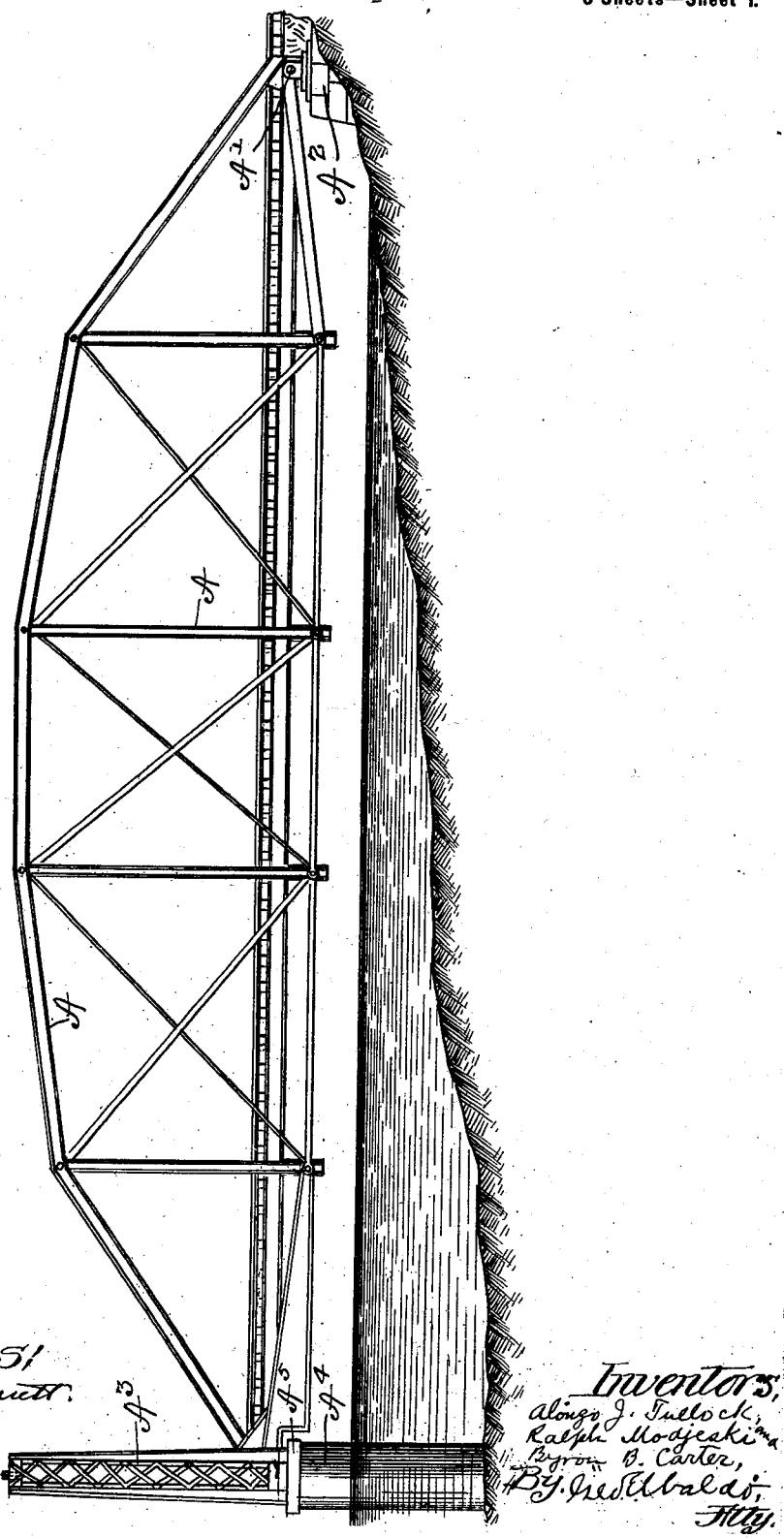

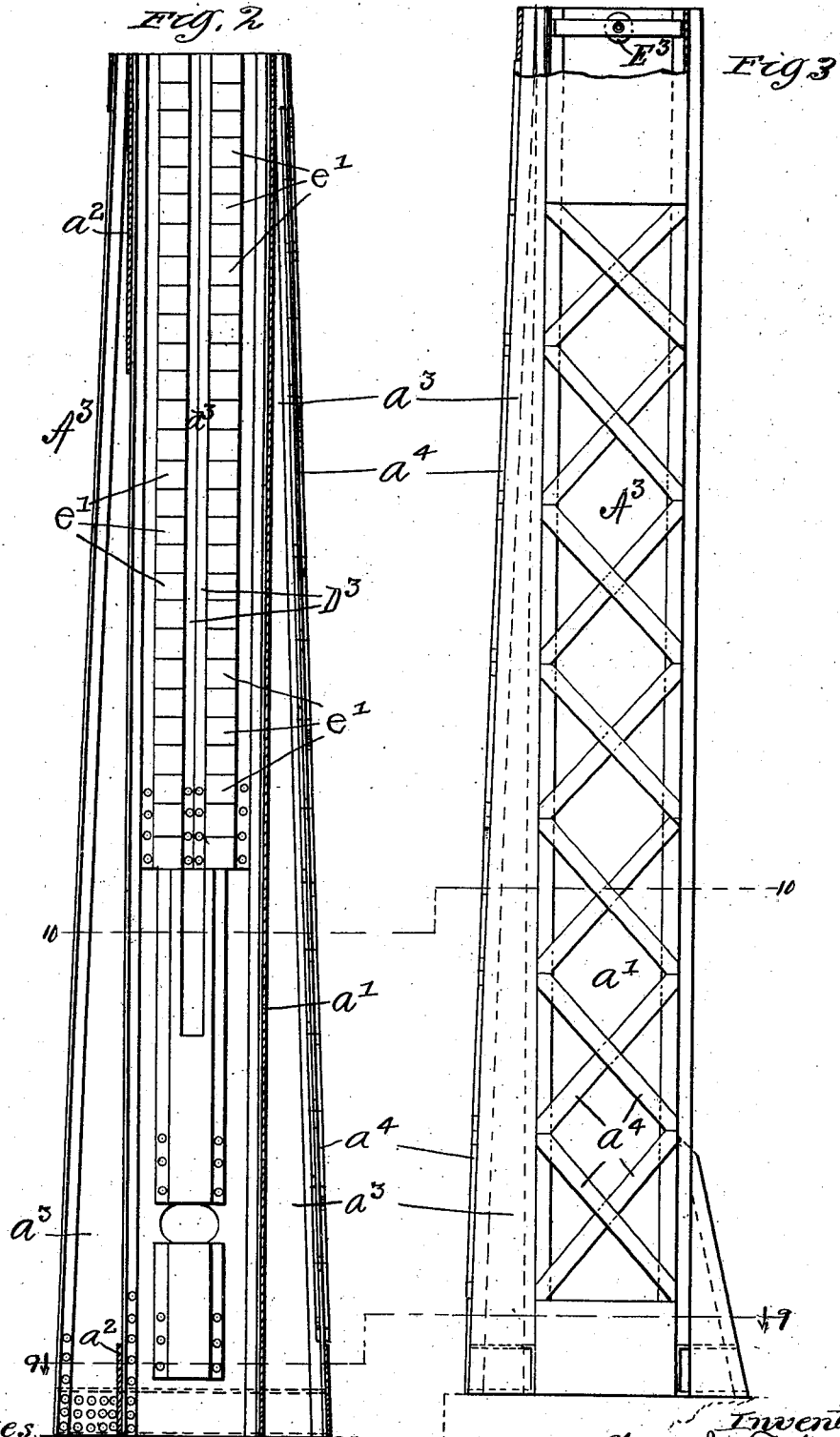

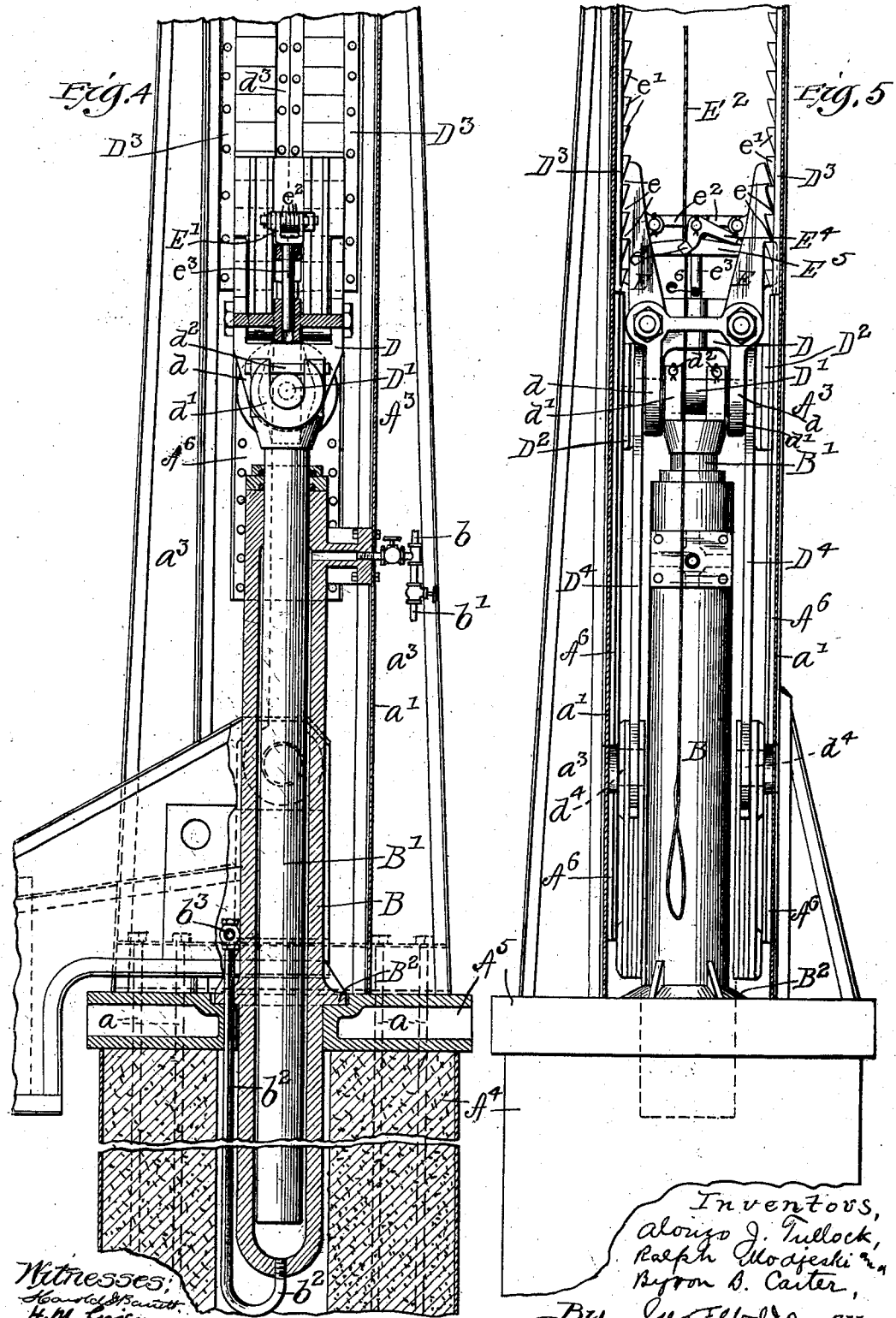

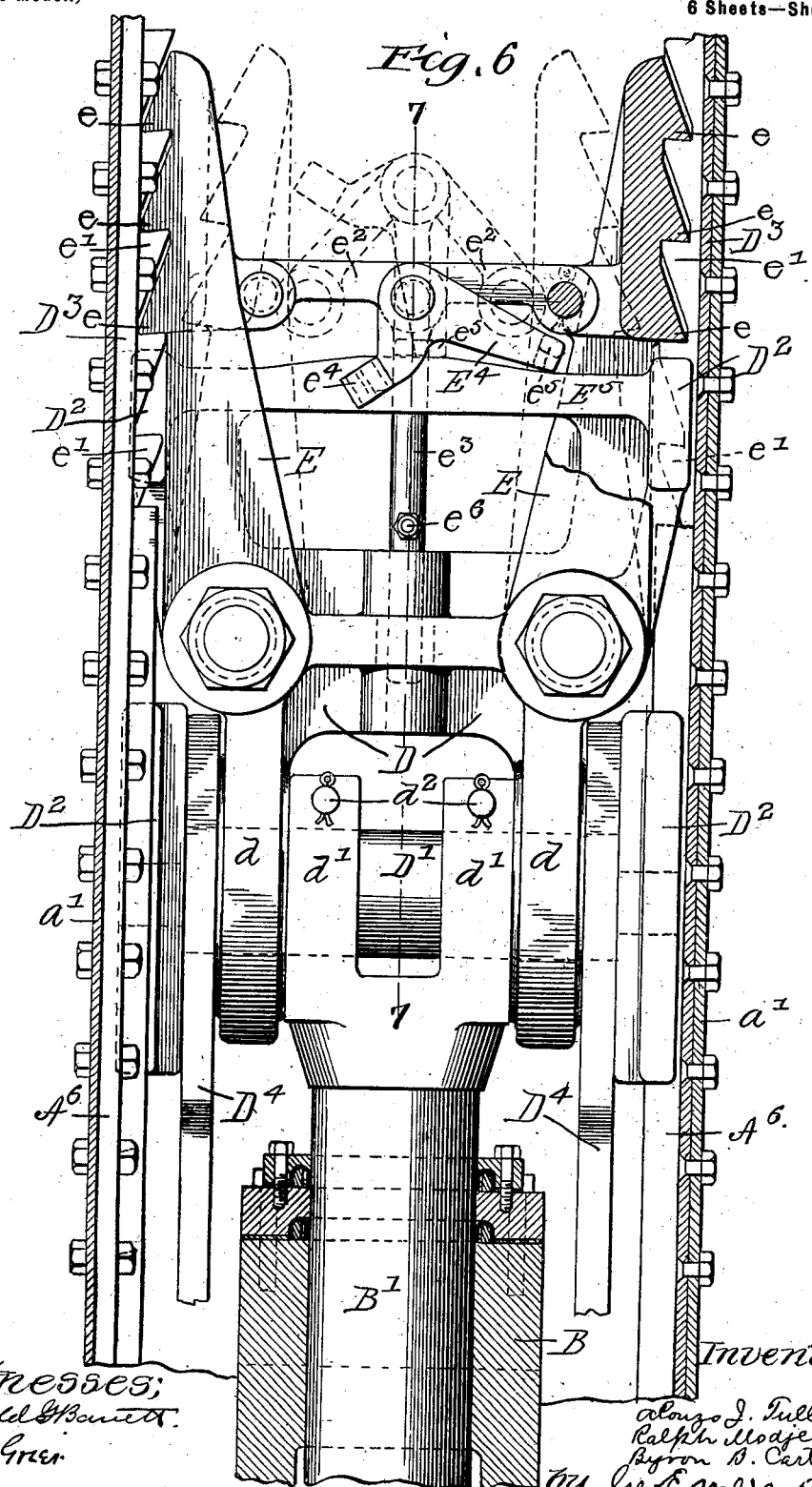

No. 693,340. Patented Feb. 11, 1902.
A. J. TULLOCK, R. MODJESKI & B. B. CARTER.
ADJUSTABLE INCLINE OR TRANSFER.
(Application filed Aug. 2, 1899.)
(No Model.) 6 Sheets—Sheet 5.
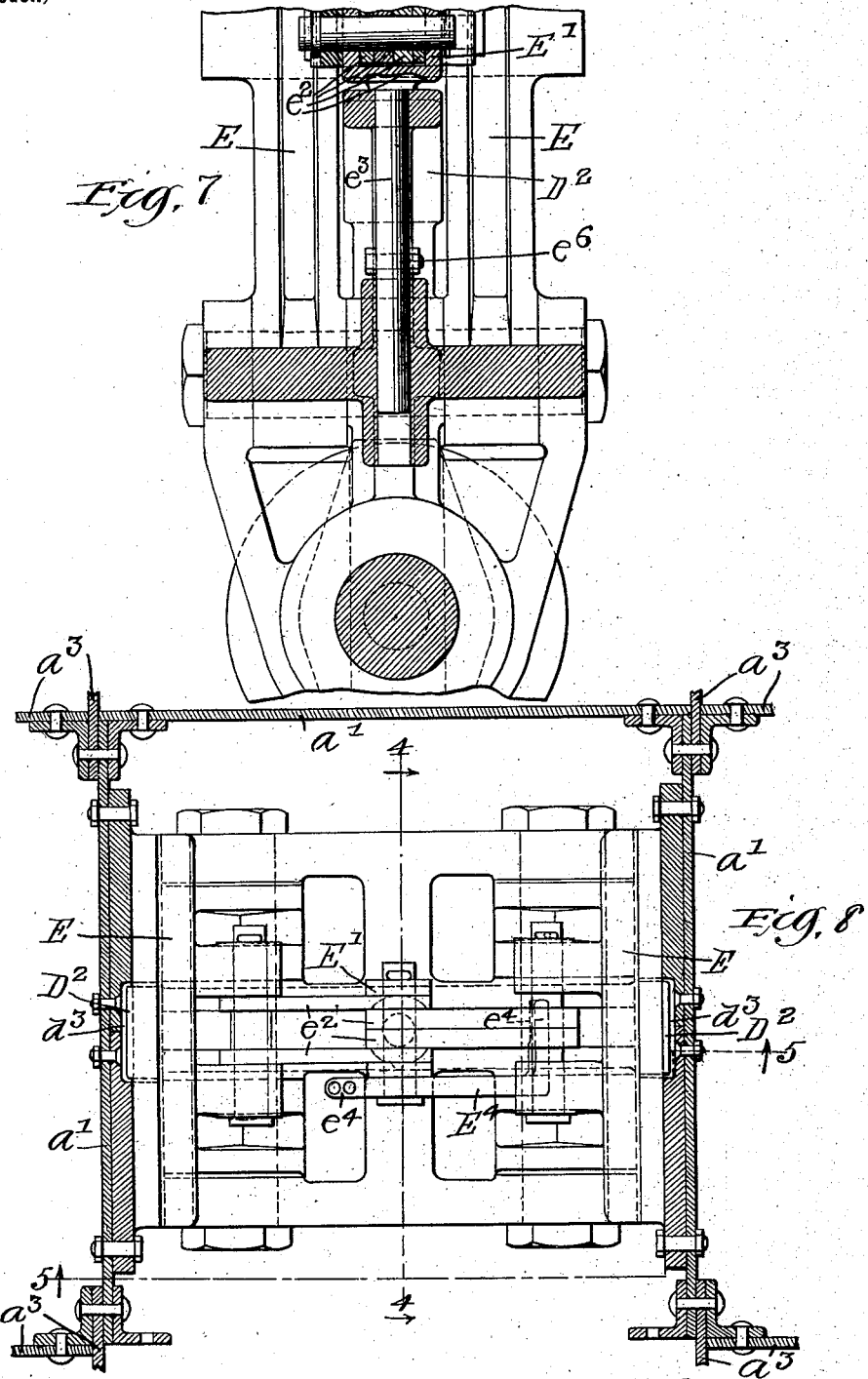

No. 693,340. Patented Feb. 11, 1902.
A. J. TULLOCK, R. MODJESKI & B. B. CARTER.
ADJUSTABLE INCLINE OR TRANSFER.
(Application filed Aug. 2, 1899.)
(No Model.) 6 Sheets—Sheet 6.
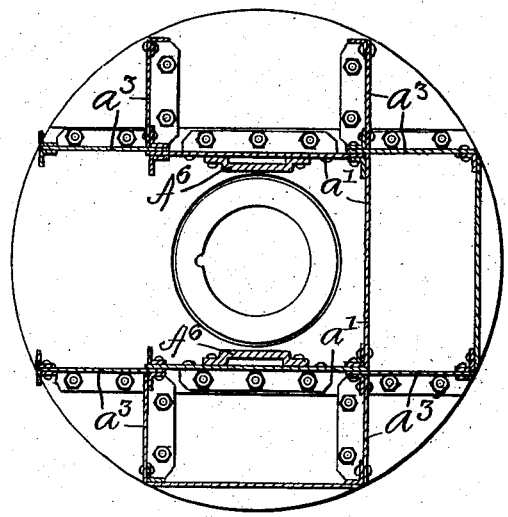
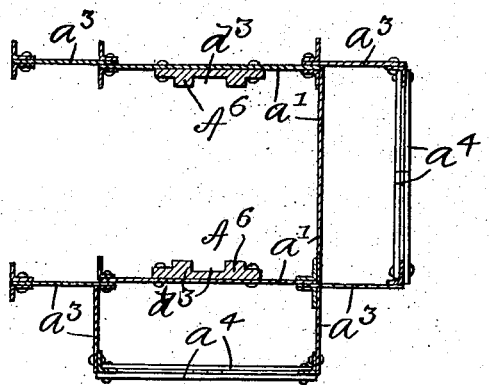
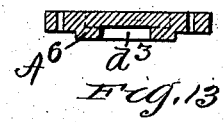
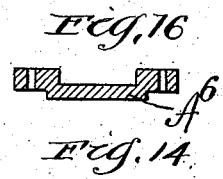
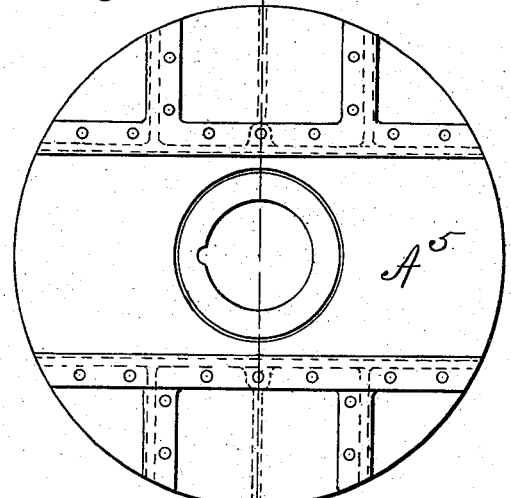
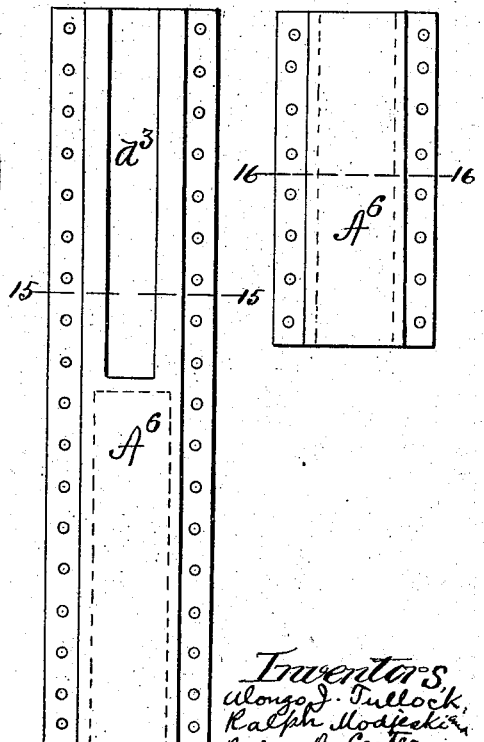
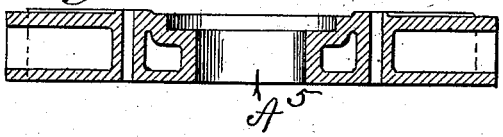

UNITED STATES PATENT OFFICE.

ALONZO J. TULLOCK, OF LEAVENWORTH, KANSAS; RALPH MODJESKI, OF CHICAGO, AND BYRON B. CARTER, OF HINSDALE, ILLINOIS.

ADJUSTABLE INCLINE OR TRANSFER.

SPECIFICATION forming part of Letters Patent No. 693,340, dated February 11, 1902.

Application filed August 2, 1899. Serial No. 725,840. (No model.)

*To all whom it may concern:*

Be it known that we, ALONZO J. TULLOCK, a resident of Leavenworth, in the county of Leavenworth and State of Kansas, RALPH MODJESKI, a resident of Chicago, in the county of Cook, and BYRON B. CARTER, a resident of Hinsdale, in the county of Dupage, State of Illinois, citizens of the United States, have invented certain new and useful Improvements in Adjustable Inclines or Transfers, of which the following is a specification.

This invention relates to improvements in inclines or transfers, and relates particularly to improvements in vertically-adjustable inclines or transfers of the type designed and adapted for transferring locomotives, cars, vehicles of all kinds, merchandise, stock, and foot-passengers from vessels to docks, wharves, or the shore.

A primary object of the invention is to provide an improved mechanism for operating and supporting the adjustable ends of inclines or transfers of this type.

An incline or transfer of our invention consists of the various features, combinations of features, and details of construction hereinafter described and claimed.

In the accompanying drawings an incline or transfer embodying our invention is fully illustrated.

Figure 1 is a side elevation of an incline of our invention. Figs. 2 and 3 are detail views of the supporting-towers. Fig. 4 is a combined sectional view and elevation taken on the line 4 4 of Fig. 8. Fig. 5 is a sectional view of the tower on the line 5 5 of Fig. 8, showing the hydraulic jack and locking mechanism in side elevation. Fig. 6 is an enlarged side view of the locking mechanism similar to Fig. 5, showing the locking-pawls in retracted position in dotted lines. Fig. 7 is a sectional elevation on the line 7 7 of Fig. 6. Fig. 8 is a plan view of the locking mechanism, showing a tower in section. Figs. 9 and 10 are sectional views of the towers on the lines 9 9 and 10 10, respectively, of Figs. 2 and 3. Figs. 11 and 12 show in detail the construction of the caps secured to the tops of the piers, and Figs. 13, 14, 15, and 16 are enlarged views showing in detail the construction of the lower blocks secured to the interiors of the towers to guide the adjustable ends of the lower chords of the bridge-span.

Referring now to the drawings, A designates a bridge-span, one end of which is pivoted at A' to a suitable pier or support $A^2$. The span A, the pier $A^2$, and the pivotal support for said span may be of any usual or approved construction and will not be described in detail, as they form no part of the present invention.

Supported in upright position at the adjustable end of the bridge-span A are towers $A^3$, to which said adjustable end of said bridge-span is adapted to be locked or rigidly secured when in desired vertical adjustment and which are provided with guide-surfaces designed and adapted to be engaged by rigid portions of the bridge-span A, which will thus at all times be maintained and supported against lateral displacement from wind-pressure or from other cause.

The towers $A^3$ are supported upon any suitable foundation, to which they are rigidly secured. As shown, said towers are supported upon cylindrical concrete piers $A^4$, to the tops of which are secured metallic caps $A^5$. The towers $A^3$ are secured to the piers $A^4$ by bolts or tie-rods $a$, anchored in said piers and which also operate to secure said caps $A^5$ in position upon said piers.

In the preferable construction shown the towers $A^3$ are hollow and the sides thereof toward the bridge-span are open, and the ends of the lower chords of said bridge-span extend into the hollow interiors thereof.

A desirable form of column consists of solid plates $a'$, secured together to form three sides of a square or rectangular structure. On the fourth side of said column the plates $a'$, which form the adjacent sides thereof, are connected at top and bottom by plates $a^2$, leaving an opening therein to receive the ends of the lower chords of the bridge-span and to permit desired vertical adjustment thereof. Said towers also comprise plates $a^3$, secured to the sides thereof, said plates extending longitudinally of said columns and at right angles to the sides thereof. The outer edges of the plates $a^3$ are connected by lattice-bracing $a^4$. Secured to the interiors of the said towers $A^3$ are plates $A^6$, the faces of which form guides between which the ends of the lower chords of the bridge-span A are confined and which operate at all times to maintain and support the adjustable end of said bridge-span against lateral displacement.

The free end of the bridge-span A is adapted to be adjusted by means of hydraulic jacks applied thereto in the following manner: Beneath the end of each lower chord of the bridge-span A is a hydraulic jack, comprising a barrel or cylinder B, supported in upright position upon the corresponding supporting-pier $A^4$ and a piston or ram $B'$. As shown, the barrels or cylinders B are supported by flanges or collars $B^2$, formed thereon at about the middle longitudinally thereof, which rest upon the caps $A^5$, suitable wells or openings being formed in the piers $A^4$ to receive the lower ends of said cylinders or barrels. Water under pressure is delivered to the barrels or cylinders of the jacks from any suitable source of supply (not shown) through pipes $b$ and may be discharged therefrom through waste-pipes $b'$ in controlled communication with said pipes $b$. Said jack-cylinders B are also provided with pipes $b^2$, controlled by valves $b^3$ and which communicate with the lower ends of said cylinders. Means are thus provided for removing from said cylinders any sediment which may accumulate therein. Secured to the upper ends of the rams or pistons $B'$ are heads D, which are fitted to and are longitudinally movable in suitable guides formed on the interiors of the towers $A^3$ and which are in alinement with said rams or pistons $B'$. As shown, the heads D are secured to the rams or pistons $B'$ by pins $D'$, fitted to suitable holes or openings formed in lugs or ears $d$, formed on said heads, and to yokes $d'$, formed in the ends of said rams or pistons. The pins $D'$ are secured in the yokes $d'$ by means of pins $d^2$. As shown, also, the heads D are guided by means of blocks $D^2$, of which the upper blocks are rigidly secured to said heads D and are preferably formed integral therewith, and the lower blocks are carried on the pins $D'$, which engage guide-grooves $d^3$, formed partly in the plates $A^6$ and partly in plates $D^3$, secured to the interiors of said towers $A^3$ and which are disposed so as to form, in effect, continuations or extensions of the plates $A^6$. The heads D and the plates $D^3$ are preferably made of cast-steel. The heads D, carried on the rams or pistons $B'$, are connected to the ends of the lower chords of the bridge-span A by means of links $D^4$, which are pivoted upon the pins $D'$ at one end and the opposite ends of which are pivoted to pins $d^4$, secured in the ends of said lower chords of said bridge-span. Said hydraulic jacks are thus applied directly to the bridge-span and are sufficiently powerful to raise the same.

The invention also comprises means for locking the heads D to the towers, so that they will be supported independently of the hydraulic jacks, which we will now describe.

Pivoted to the heads D are dogs or pawls E, on which are formed teeth $e$, which are adapted to engage teeth $e'$ on the towers. As shown, the teeth $e'$ are formed on the guide-blocks $D^3$ on both sides of the guide-grooves $d^3$, formed therein. The upper guide-blocks $D^2$ project through openings formed in the lower ends of the pawls or dogs E. Pivotal movement to effect engagement and disengagement of the teeth $e$ of the pawls E with the teeth $e'$ on the towers is imparted to said dogs or pawls by means of links $e^2$, one end of each of which is pivoted to one of the pawls E above its pivotal point, their opposite ends being pivoted to yokes $E'$. The links $e^2$ thus form toggle-levers, which may be flexed to disengage the pawls E from the teeth $e'$ by raising the yokes $E'$ or straightened to effect engagement of said pawls with said teeth by lowering said yokes. The yokes $E'$ are provided with shanks $e^3$, which are fitted to and are longitudinally movable in holes or guides formed in the heads D. Thus the same movement will always be imparted to both of the pawls on each head. The yokes $E'$ are raised and lowered by means of ropes $E^2$ applied thereto and which are adjusted to sheaves $E^3$, revolubly supported adjacent to the tops of the towers $A^3$.

In the preferable form of the device means are provided for securing the pawl-actuating toggles in flexed position. Simple means for this purpose consist of arms $E^4$, pivoted upon the yokes $E'$, which are adapted to be swung into engagement with a rigid portion of the head when said toggles are fully flexed. In the preferable construction shown the arms $E^4$ are rigidly secured to the pivot-pins in the yokes $E'$ and are provided with laterally-projecting arms $e^4$, to which the ropes $E^2$ are attached. The free ends of the arms $E^4$ bear upon the tops of webs $E^5$ on the heads D, and they are provided with lateral projections $e^5$, which project therefrom, so as to strike against the shanks $e^3$ of the yokes $E'$ and limit the pivotal movement of said arms $E^4$. The upward movement of the yokes $E'$ is limited by means of a stop $e^6$ on the shank $e^3$ of said yokes, the position of which is such that the pawls E will not be retracted back of their pivotal points. The pawls E being in engagement with the teeth $e'$ on the towers, it is obvious that a strain or pull on the ropes $E^2$ in the proper direction will operate to raise the yokes $E'$ and will also operate to turn the arms $E^4$ pivotally until the projections $e^5$ strike the shanks $e^3$ of the yokes $E'$, in which position the arms $E^4$ are substantially vertical. Again, the toggles being flexed a strain on the ropes $E^2$ in the proper direction will operate to release the locking-arms $E^4$ and to draw down the yokes $E'$, thus straightening said toggles.

When it is desired to vary the vertical adjustment of the span A, said span is first raised slightly by means of the hydraulic jacks in order to facilitate the disengagement of the pawls E from the rack-teeth $e'$ on the towers and to support said span. When said pawls are so disengaged from said towers, said span is then raised or lowered to bring the same into desired vertical adjustment by means of the hydraulic jacks, and when in desired vertical adjustment the pawls E are again thrown into engagement with the rack-teeth $e'$ on the towers, thereby securely locking said span in position and relieving said jacks from all strain due to the weight thereof.

We claim—

1. The combination of a vertically-adjustable bridge-span, towers adjacent thereto, means to raise and lower said bridge-span and means to secure said bridge-span to said towers in desired vertical adjustment, substantially as described.

2. The combination of a vertically-adjustable bridge-span, towers adjacent thereto, guides on said towers which are engaged by rigid portions of said bridge-span, means to raise and lower said bridge-span and means to secure said bridge-span to said towers, substantially as described.

3. The combination of a vertically-adjustable bridge-span, towers adjacent thereto, a hydraulic jack or jacks applied to said bridge-span and adapted to raise and lower the same and means to secure said bridge-span to said towers in desired vertical adjustment, substantially as described.

4. The combination of a bridge-span, towers adjacent thereto, vertical guides on the towers which are engaged by rigid portions of said bridge-span, a hydraulic jack or jacks applied to said bridge-span and adapted to raise and lower the same and means to secure said bridge-span to said towers, substantially as described.

5. The combination of a bridge-span, towers adjacent thereto, heads fitted to and longitudinally movable in guides or ways formed in said towers, means to lock or secure said heads to said towers, links connecting said heads with said bridge-span and means to raise and lower said bridge-span, substantially as described.

6. The combination of a bridge-span, towers adjacent thereto, heads fitted to and longitudinally movable in guides or ways formed in said towers, teeth formed in the sides of said towers, locking-blocks carried on said heads, teeth thereon which are adapted to engage said teeth on the towers, means to advance and retract said locking-blocks to engage the teeth thereon with and to disengage said teeth from the teeth on said towers, links connecting said heads with said bridge-span and means to raise and lower said bridge-span, substantially as described.

7. The combination of a bridge-span, towers adjacent thereto, heads fitted to and longitudinally movable in guides or ways formed in said towers, teeth formed in the sides of said towers, pawls pivoted to said heads, teeth on which are adapted to engage said teeth on the towers, means to impart pivotal movement to said pawls to effect engagement and disengagement of the teeth on said pawls with the teeth on the towers, links connecting said heads with said bridge-span and means to raise and lower said bridge-span, substantially as described.

8. The combination of a bridge-span, towers adjacent thereto, heads fitted to and longitudinally movable in guides or ways formed in said towers, teeth formed in the sides of said towers, pawls pivoted to said heads, teeth on which are adapted to engage said teeth on the towers, toggles applied to said pawls, means to flex and straighten said toggles, links connecting said heads with said bridge-span and means to raise and lower said bridge-span, substantially as described.

9. The combination of a bridge-span, towers adjacent thereto, heads fitted to and longitudinally movable in guides or ways formed in said towers, teeth formed in the sides of said towers, pawls pivoted to said heads, teeth on which are adapted to engage said teeth on the towers, means to advance and retract said pawls to effect engagement and disengagement of the teeth thereon with the teeth on the towers, means to secure said pawls in advanced and retracted positions and to release them, links connecting said heads with said bridge-span and means to raise and lower said bridge-span, substantially as described.

10. The combination with a bridge-span and means to raise and lower the same, of towers adjacent to said bridge-span, heads fitted to and longitudinally movable in guides or ways in said towers, teeth on said towers, pawls pivoted to said heads, teeth on which are adapted to engage said teeth on said towers, toggles applied to said pawls, means to flex and straighten said toggles, arms adapted to lock said toggles in flexed position, means to trip said arms and links connecting said heads with said bridge-span, substantially as described.

11. The combination with a bridge-span and means to raise and lower the same, of towers adjacent to said bridge-span, heads fitted to and longitudinally movable in guides or ways formed in said towers, links connecting said heads with said bridge-span, teeth formed in the sides of said towers, pawls pivoted to said heads, teeth on which are adapted to engage said teeth on the towers, toggles applied to said pawls, yokes in which the pivot-pins of said toggles are carried, shanks on said yokes which engage guides in the supporting-heads, locking-arms secured to said toggle-pins, lever-arms likewise secured to said toggle-pins, operating-ropes secured to said lever-arms and stops adapted to limit the movement of said locking-arms, substantially as described.

12. The combination of a bridge-span, towers adjacent thereto, hydraulic jacks, heads secured to the piston-rods of said jacks, said heads being fitted to and longitudinally movable in guides or ways formed in said towers, links which connect said heads with said bridge-span and means to lock or secure said heads firmly to said towers, substantially as described.

13. The combination of a bridge-span, towers adjacent thereto, guide-surfaces formed on said towers which are engaged by rigid portions of said bridge-span, hydraulic jacks, heads secured to the piston-rods of said jacks, said heads being fitted to and longitudinally movable in ways or guides formed on said towers, links which connect said heads with the bridge-span and means to lock or secure said heads firmly to said towers, substantially as described.

14. The combination with a load, of a head to which said load is connected, a tower, guides thereon to which said head is fitted and along which it is movable, means to impart movement to said head longitudinally of said guides and means to secure said head to said tower, said means comprising teeth on said tower, locking-blocks on said head, teeth thereon adapted to engage the teeth on said tower and means under the control of the operator to advance and retract said locking-blocks to effect engagement and disengagement of the teeth thereon with the teeth on said tower, substantially as described.

15. The combination with a load, of a head to which said load is connected, a tower, guides thereon to which said head is fitted and along which it is movable, means to impart movement to said head longitudinally of said guides and means to lock or secure said head to said tower, said means consisting of teeth on said tower, pawls pivoted to said head, teeth thereon adapted to engage the teeth on said tower, means under the control of the operator to impart pivotal movement to said pawls to effect engagement and disengagement of the teeth thereon with the teeth on said tower, substantially as described.

16. The combination with a load, of a head to which said load is connected, a tower, guides thereon to which said head is fitted and along which it is movable, means to impart movement to said head longitudinally of said guides and means to lock or secure said head to said tower, said means comprising teeth on said tower, pawls pivoted to said head, teeth thereon adapted to engage the teeth on said tower, toggles applied to said pawls and means under the control of the operator to flex and straighten said toggles, substantially as described.

17. The combination with a load, of a head to which said load is connected, a tower, guides thereon to which said head is fitted and along which it is movable, means to impart movement to said head longitudinally of said guides and means to lock or secure said head to said tower, said means consisting of teeth on said tower, pawls pivoted to said head, teeth thereon adapted to engage the teeth on said tower, means under the control of the operator to advance and retract said pawls to effect engagement and disengagement of the teeth thereon with the teeth on said tower and means to secure said pawls in advanced and retracted position and to release them, substantially as described.

18. The combination with a load, of a head to which said load is connected, a tower, guides thereon to which said head is fitted and along which it is movable, means to impart movement to said head along said guides and means to lock or secure said head to said tower, said means consisting of teeth on said tower a pawl or pawls pivoted to said head, teeth thereon adapted to engage the teeth on the tower, toggles applied to said pawl or pawls, means under the control of the operator to flex and straighten said toggles, an arm adapted to lock said toggles in flexed position and means to trip said arm, substantially as described.

19. The combination with a load, of a head to which said load is connected, a tower, guides thereon to which said head is fitted and along which it is movable longitudinally, means to impart movement to said load lengthwise of said guides and means to lock or secure said head to said tower, said means consisting of teeth formed on said tower, a pawl or pawls pivoted to said head, teeth thereon adapted to engage the teeth on said tower, a toggle applied to said pawl or pawls, a yoke in which the pivot-pin of said toggle is carried, a shank on said yoke which is fitted to a guide in said head, a locking-arm secured to said toggle-pin, a lever-arm likewise secured to said toggle-pin, an operating-rope secured to said lever-arm and a stop adapted to limit the movement of said lever-arm, substantially as described.

In testimony that we claim the foregoing as our invention we have hereunto set our hands this 22d day of July, 1899.

ALONZO J. TULLOCK.
RALPH MODJESKI.
BYRON B. CARTER.

Witnesses:
H. W. GRIER,
J. H. FRAMBACH.